(12) United States Patent
Kurth et al.

(10) Patent No.: US 7,295,947 B2
(45) Date of Patent: Nov. 13, 2007

(54) ABSOLUTE POSITION DETERMINATION OF AN OBJECT USING PATTERN RECOGNITION

(75) Inventors: Antony J. Kurth, Bradenton, FL (US); Karl H. Becker, Riverview, FL (US)

(73) Assignee: Honeywell International Inc., Morristown, NJ (US)

( * ) Notice: Subject to any disclaimer, the term of this patent is extended or adjusted under 35 U.S.C. 154(b) by 143 days.

(21) Appl. No.: 11/004,759

(22) Filed: Dec. 3, 2004

(65) Prior Publication Data

US 2006/0058978 A1 Mar. 16, 2006

Related U.S. Application Data

(60) Provisional application No. 60/608,819, filed on Sep. 10, 2004.

(51) Int. Cl.
*G01C 9/00* (2006.01)

(52) U.S. Cl. .................. 702/151; 702/150

(58) Field of Classification Search ............ 702/150, 702/151

See application file for complete search history.

(56) References Cited

U.S. PATENT DOCUMENTS

| | | | |
|---|---|---|---|
| 3,039,316 A | 6/1962 | Slater | |
| 3,056,303 A | 10/1962 | Naylor | |
| 3,365,942 A | 1/1968 | Blazek | |
| 3,439,546 A | 4/1969 | Baker et al. | |
| 3,576,124 A | 4/1971 | O'Connor | |
| 3,670,585 A | 6/1972 | Alexander et al. | |
| 3,769,710 A | 11/1973 | Reister | |
| 3,782,167 A | 1/1974 | Stuelpnagel | |
| 4,003,265 A | 1/1977 | Craig et al. | |

(Continued)

FOREIGN PATENT DOCUMENTS

GB 866473 4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: Ma, USA.

(Continued)

*Primary Examiner*—John Barlow
*Assistant Examiner*—Stephen J. Cherry
(74) *Attorney, Agent, or Firm*—Fogg & Powers LLc

(57) ABSTRACT

A contact free optical position sensor for an inertial reference system. An optical sensor is adapted to generate image signals of a gas bearing supported inertial sensor assembly. The surface of the inertial sensor assembly is adapted with a reference surface pattern. A controller is coupled to receive the image signals from the optical sensor and is adapted with an image map of the reference surface pattern stored in a memory means that allows the controller to uniquely correlate an image captured by the optical sensor to an absolute position on the inertial sensor assembly. The controller is further adapted to determine the absolute position and attitude of the inertial sensor assembly based on the correlation between the imaged reference pattern features, the imaged reference pattern's angle of rotation, and the map of the reference pattern.

49 Claims, 7 Drawing Sheets

U.S. PATENT DOCUMENTS

| | | |
|---|---|---|
| 4,150,579 A | 4/1979 | Vaughn |
| 4,244,215 A | 1/1981 | Merhav |
| 4,515,486 A | 5/1985 | Ide |
| 4,671,650 A * | 6/1987 | Hirzel et al. .................. 356/28 |
| 4,711,125 A | 12/1987 | Morrison |
| 4,723,735 A | 2/1988 | Eisenhaure et al. |
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,319,577 A | 6/1994 | Lee |
| 5,357,437 A | 10/1994 | Polvani |
| 5,396,326 A | 3/1995 | Knobbe et al. |
| 5,710,559 A | 1/1998 | Krogmann |
| 5,894,323 A | 4/1999 | Kain et al. |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,741,209 B2 | 5/2004 | Lee |
| 6,826,478 B2 | 11/2004 | Riewe et al. |
| 7,003,399 B1 | 2/2006 | Chappell |
| 2002/0077189 A1 | 6/2002 | Tuer et al. |
| 2003/0120425 A1 | 6/2003 | Stanley et al. |
| 2004/0015323 A1 | 1/2004 | Boyton |
| 2004/0075737 A1 | 4/2004 | Kirby |
| 2004/0089083 A1 | 5/2004 | Bailey |
| 2004/0212803 A1 | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected Mems-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

NG, "The Optical Mouse as a Two-Dimensional Displacement Sensor", "Sensors and Actuators a", Oct. 1, 2003, pp. 21-25, vol. 107, No. 1, Publisher: Elseveier Sequoia S.A., Published in: Lausanne, Ch.

* cited by examiner

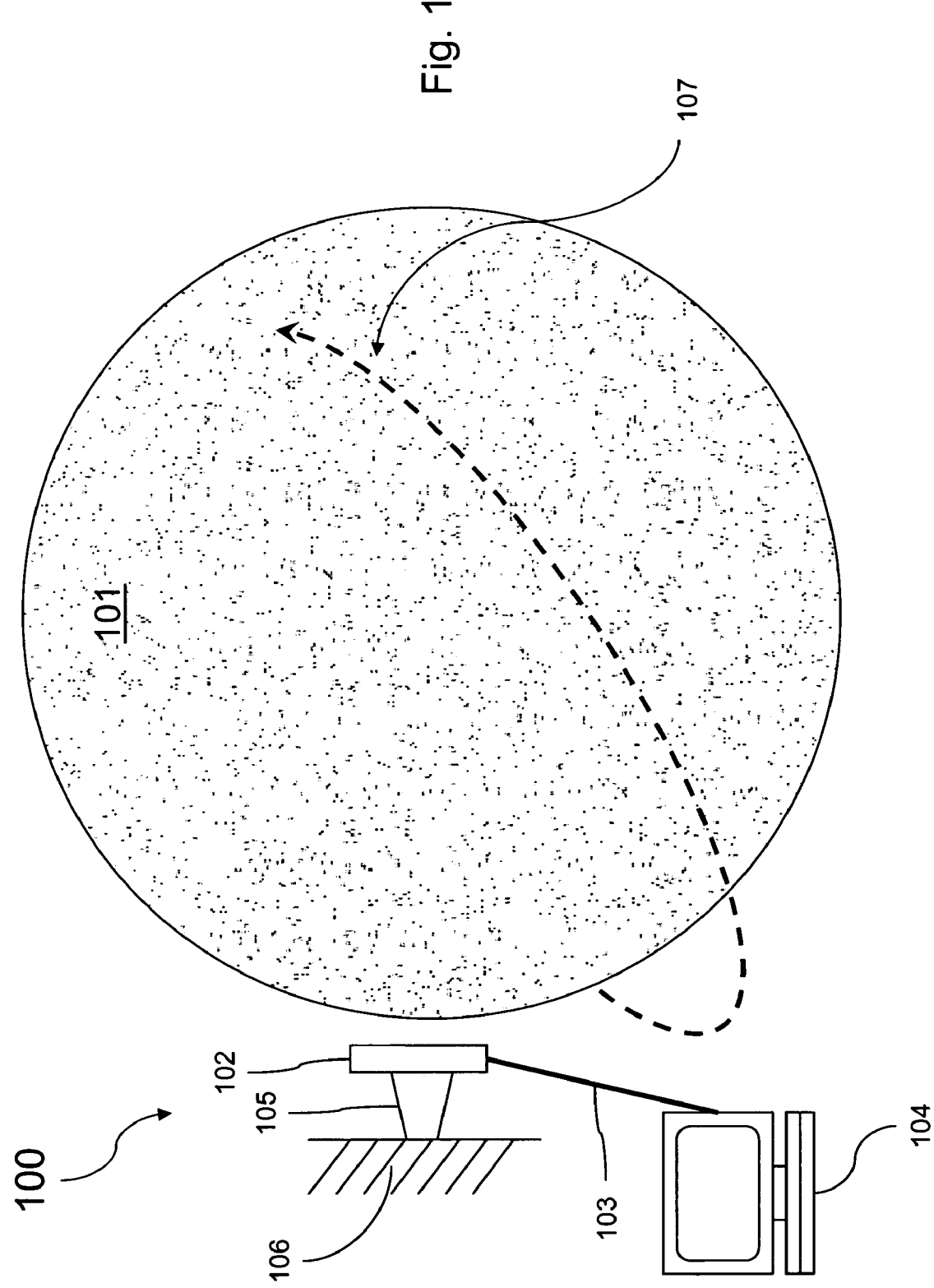

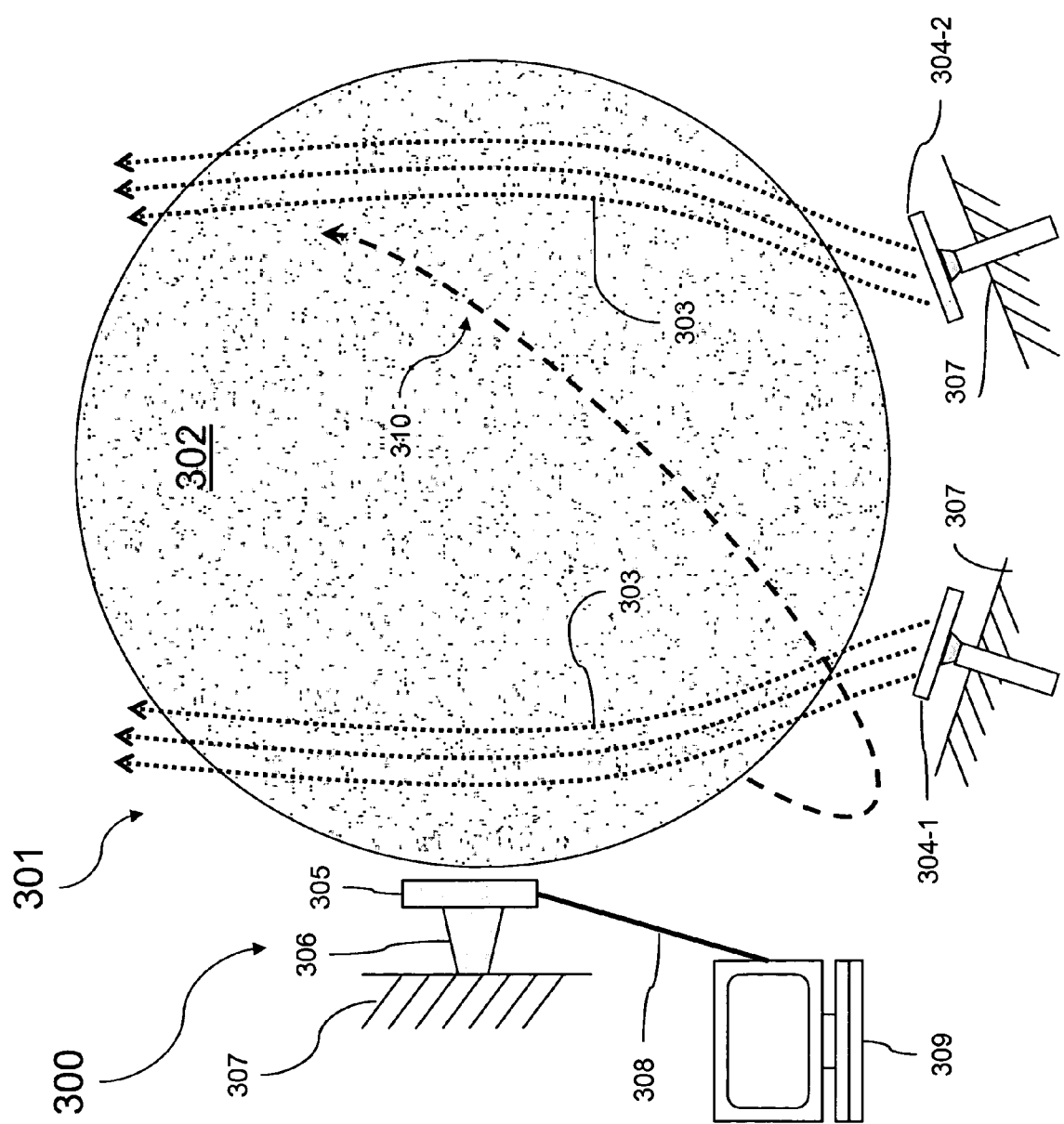

ABSOLUTE POSITION DETERMINATION OF AN OBJECT USING PATTERN RECOGNITION

CROSS REFERENCE TO RELATED APPLICATIONS

This application is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, which is incorporated herein by reference.

This application is related to co-pending U.S. patent application Ser. No. 11/004,184, filed on Dec. 3, 2004 and entitled "GAS SUPPORTED INERTIAL SENSOR SYSTEM AND METHOD" (the '6540 Application). The '6540 Application is incorporated herein by reference.

This application is also related to the following applications filed on even date herewith, all of which are hereby incorporated herein by reference:

U.S. patent application Ser. No. 11/004,531, filed U.S. Ser. No. 11/004,531, filed on Dec. 3, 2004, entitled "SPHERICAL POSITION MONITORING SYSTEM," (the '7169 Application);

U.S. patent application Ser. No. 11/004,743, filed on Dec. 3, 2004, entitled "PRECISE, NO-CONTACT, POSITION SENSING USING IMAGING," (the '7057 Application);

U.S. patent application Ser. No. 11/004,529, filed on Dec. 3, 2004, entitled "THREE DIMENSIONAL BALANCE ASSEMBLY," (the '7194 Application);

U.S. patent application Ser. No. 11/004,452, filed on Dec. 3, 2004, entitled "ARTICULATED GAS BEARING SUPPORT PADS," (the '6475 Application);

U.S. patent application Ser. No. 11/004,214, filed on Dec. 3, 2004, entitled "GAS JET CONTROL FOR INERTIAL MEASUREMENT UNIT," (the '6535 Application);

U.S. patent application Ser. No. 11/004,177, filed on Dec. 3, 2004, entitled "RE WIRELESS COMMUNICATION FOR DEEPLY EMBEDDED AEROSPACE SYSTEMS," (the '6345 Application); and U.S. patent application Ser. No. 11/004,517, filed on Dec. 3, 2004, entitled "GENERALIZED INERTIAL MEASUREMENT ERROR REDUCTION THROUGH MULTIPLE AXIS ROTATION DURING FLIGHT," (the '6368 Application).

TECHNICAL FIELD

The present invention generally relates to the field of positioning sensors and in particular to contact free optical position sensing for inertial reference systems.

BACKGROUND

Precision inertial navigation systems typically require concentric sets of ball bearing supported gimbals which allow instruments to freely rotate in flight maneuvers and allow them to be manipulated for calibration. The embodiments of the previously referenced '6540 Application, which is herein incorporated by reference, eliminate the need for gimbals and ball bearings by supporting the inertial sensor assembly with a spherically shaped gas bearing. The gas bearing allows rotation of the inertial sensor assembly in all axes with no wear due to contact between rotating surfaces. During the flight of a craft, the angular position of the inertial sensor assembly (sometimes also referred to as the attitude, or roll, pitch and yaw of the inertial sensor assembly) relative to the frame of the craft must be monitored at all times. However, because physical contact with the freely rotating, gas bearing supported, inertial sensor assembly is undesirable, the need arises to sense the position of the inertial sensor assembly without physical contact between the sensor and the assembly.

A typical satellite mounted stellar sensor is one example of a contact free angular position sensor. A satellite mounted stellar sensor gives precise attitude information to a satellite flying in space. A star map is first programmed into the memory of the stellar sensor. Then, when the satellite needs its current attitude, it captures an image of a star field and then correlates the pattern of the stars observed to the star map in memory. By identifying the stars observed and determining the relative orientation of star field, the stellar sensor allows the satellite to determine its precise attitude in space. A stellar sensor for a satellite relies on the relative position of observable stars in outer space, which provides a relatively static and reliable source of reference points to correlate against. However, in applications where the surrounding environment is dynamic in nature, the use of external reference points is not feasible, resulting in the need for the current invention.

For the reasons stated above and for other reasons stated below which will become apparent to those skilled in the art upon reading and understanding the specification, there is a need in the art for a means to determine the absolute position of an object using pattern recognition.

SUMMARY

The Embodiments of the present invention address the problem of sensing and measuring the position of an object, where physical contact with the object is undesirable, through using pattern recognition, as well as other problems and will be understood by reading and studying the following specification.

In one embodiment, an angular position detection system is disclosed. An optical sensor is adapted to generate image signals of an object having a reference surface pattern. A controller is coupled to receive the image signals from the optical sensor, and adapted with an image map of the patterned surface of the object which is stored in a memory means. The controller is further adapted to correlate the image signals with the image map in order to determine the location on the object of the area imaged by the optical sensor. The controller then determines the absolute position of the object based on the area imaged.

In another embodiment, an angular position detection apparatus for an inertial navigation system is disclosed. An optical sensor is adapted to generate image signals of a gas bearing supported spherical inertial sensor assembly. The spherical inertial sensor assembly is adapted with a reference surface pattern. A controller is coupled to receive the image signals from the optical sensor and is adapted with an image map of the surface reference pattern of the inertial sensor assembly stored in a memory means. The controller is further adapted to correlate the image signals with the image map to determine the location on the inertial sensor assembly of the area imaged by the optical sensor, and then determine the absolute position of the inertial sensor assembly based on the area imaged.

In another embodiment, a method for determining the angular position of an object is disclosed. The method comprising the steps of imaging an area of a pattern on the surface of an object; determining the location of the imaged area by comparing the imaged area with a map of the pattern on the surface of the object; and determining the rotation of the imaged area by comparing the angle of the pattern of the imaged area with a map of the pattern on the surface of the object.

In another embodiment, a method for determining the angular position of a rotating object is disclosed. The method comprising applying a reference pattern to the surface of the object; mapping the pattern to specific locations on the object; obtaining an image of the object which captures an area of the reference pattern features; correlating the imaged reference pattern features and angle of rotation to the map of the reference pattern; and determining the absolute position and attitude of the object based on the correlation between the imaged reference pattern features and angle of rotation and the map of the reference pattern.

In still another embodiment, a method for determining the angular position of an inertial sensor assembly is disclosed. The method comprising applying a reference pattern to the surface of the inertial sensor assembly; mapping the reference pattern to specific locations on the inertial sensor assembly; obtaining an image of the inertial sensor assembly which captures an area of the reference pattern; correlating the imaged reference pattern features and angle of rotation to the map of the pattern; and determining the absolute position and attitude of the inertial sensor assembly based on the correlation between the features and angle of rotation of the area of the reference pattern imaged and the map of the pattern.

In yet another embodiment, a method for precisely determining the angular position of a moving object adapted with a reference pattern applied to the object's surface, where the method is embedded in a computer-readable medium, is disclosed. The method comprising capturing an image of reference pattern features on the surface of the object; correlating the captured reference pattern features and angle of rotation with a table that correlates the features of the pattern with coordinates on the object; determining the absolute position and attitude of the object based on the correlation between the captured reference pattern features and the coordinates determine from the table.

DRAWINGS

The present invention can be more easily understood and further advantages and uses thereof more readily apparent, when considered in view of the description of the preferred embodiments and the following figures in which:

FIG. 1 is a diagram illustrating a position detection system of one embodiment of the present invention;

FIG. 3 is a diagram illustrating a position detection system in combination with and gas supported inertial sensor assembly, of one embodiment of the present invention.

In accordance with common practice, the various described features are not drawn to scale but are drawn to emphasize features relevant to the present invention. Reference characters denote like elements throughout Figures and text.

DETAILED DESCRIPTION

Figure 1B:
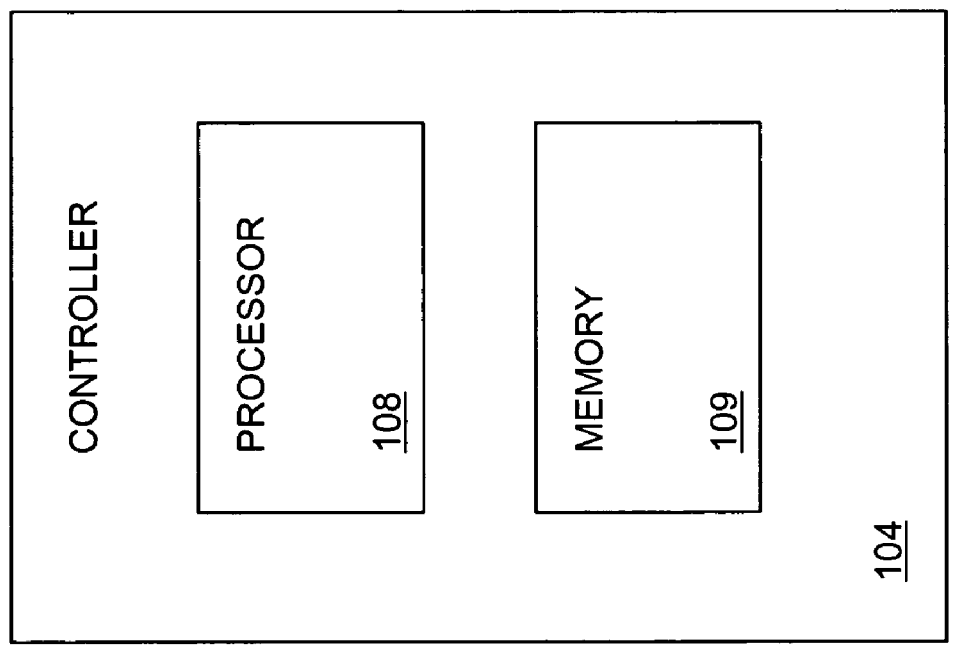
FIG. 1b illustrates a controller of one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

As previously discussed, embodiments of the commonly assigned '6540 Application, which is herein incorporated by reference, eliminate the need for gimbals and ball bearings by supporting the inertial sensor assembly with a spherically shaped gas bearing. However, because the gas bearing eliminates physical reference points provided by the gimbals, and because physical contact with the freely rotating inertial sensor assembly is undesirable, the need arises to sense the angular position of the inertial sensor assembly, without physical contact between the sensor and the assembly. Embodiments of the present invention address the problems of contact free position sensing by placing a reference surface pattern on the sphere and using an optical sensor to determine the angular position of the sphere based on an observed portion of the reference pattern.

In FIG. 1, a position detection system 100 of one embodiment of the present invention is illustrated. An optical sensor 102 is aimed at an object having a fixed reference pattern 101, such as a random pattern of dots on a ball, applied to its surface. The output of the optical sensor 102 is coupled with a controller 104 by a communication link 103. The controller 104 is adapted to contain a map of the reference pattern in a memory means. The optical sensor 102 is solidly attached through a mounting bracket 105 to a fixed position 106, while the object 101 is free to rotate. Reference number 107 generally illustrates an example of a rotational motion of the object 101. The optical sensor 102 captures an image of the ball and communicates the image to the controller 104. The controller 104 resolves the pattern of dots by correlating the image against the memorized map of the dot pattern, and calculates the exact position and orientation of the object.

Although the figures in this specification illustrate the use of a computer as a controller, as illustrated in FIG. 1b, any type of controller 104 having a memory 108 to store the pattern map, and a processor 109 that is adapted to match the image taken by an optical sensor with a coordinate on the sphere, and calculate the angular position of the sphere, can be used. Although the present invention was developed to determine the position of a freely moving sphere, the present invention may be used to determine the position of any moving object with a reference pattern.

Figure 2A:
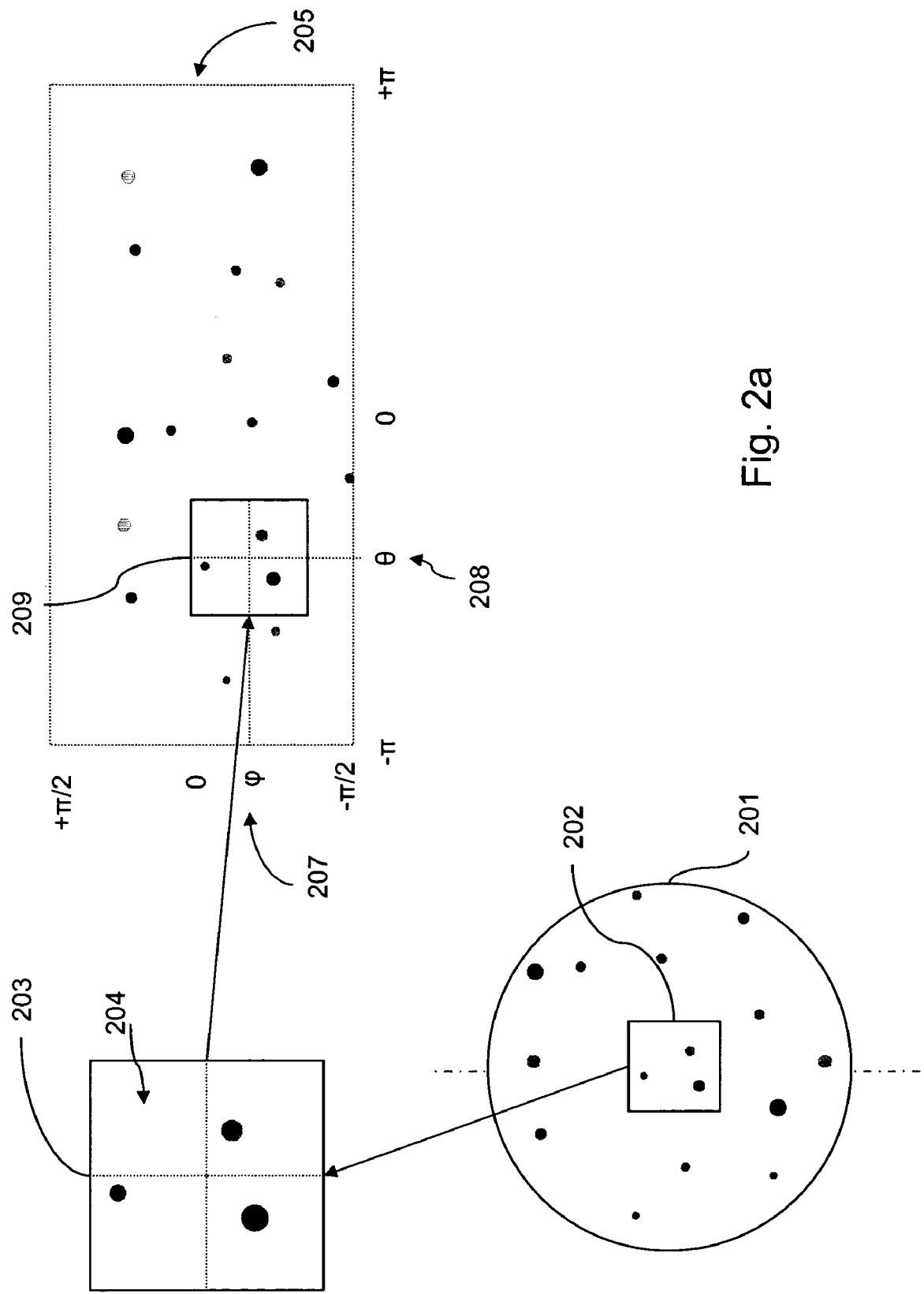
FIGS. 2a and 2b are diagrams illustrating image correlation of one embodiment of the present invention.
Figure 2B:
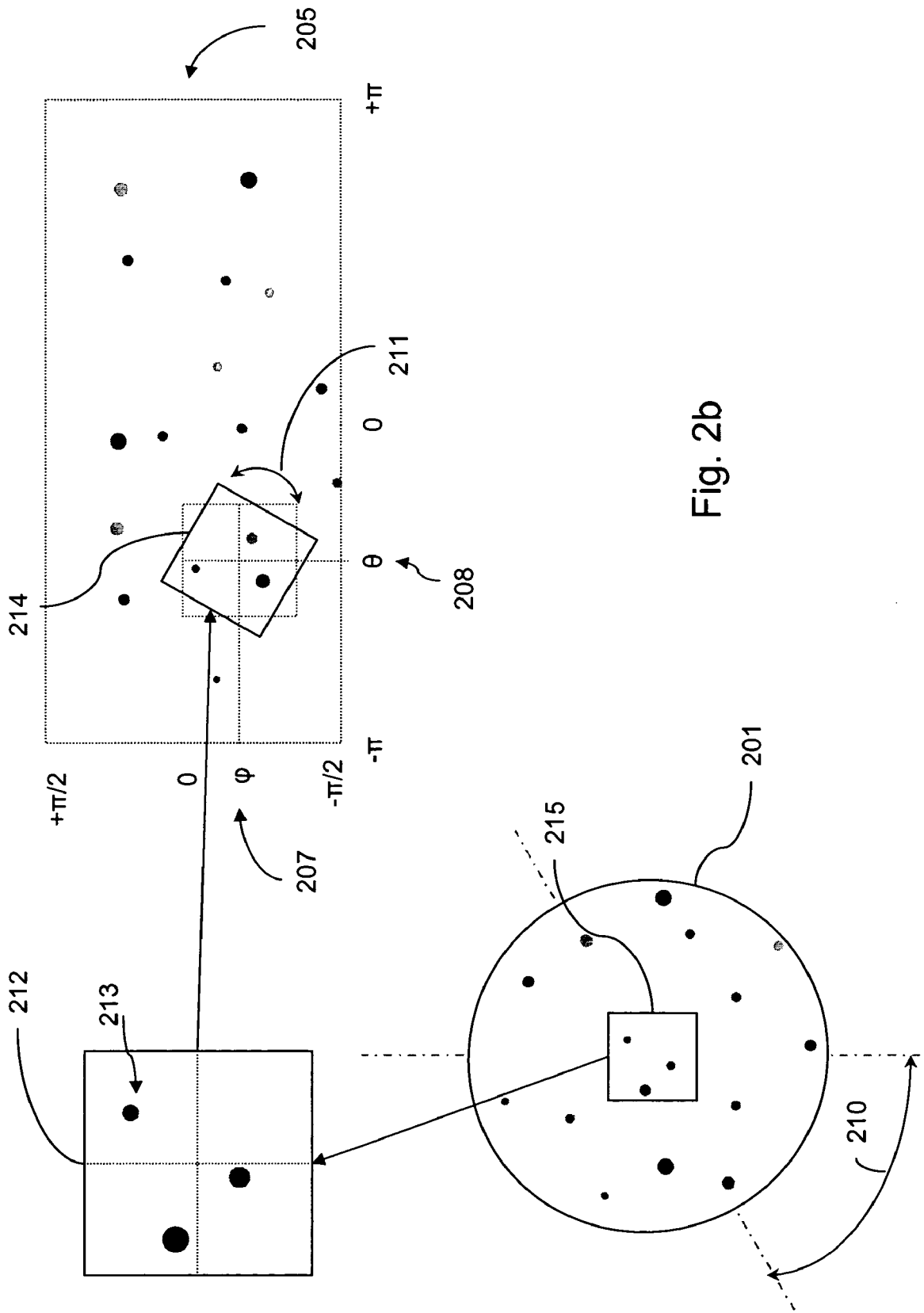
Figure 2C:
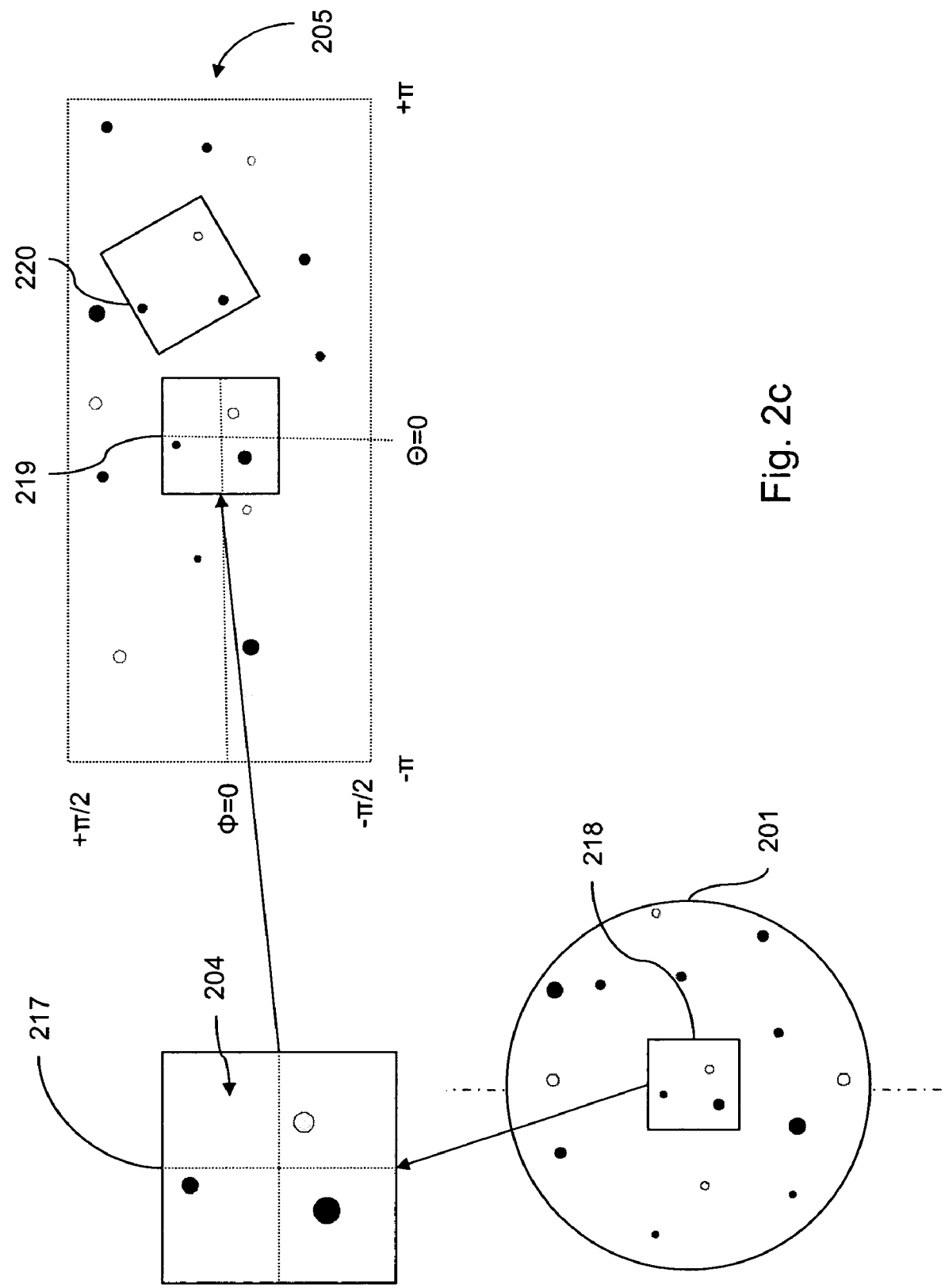

In FIGS. 2a, 2b and 2c, the correlation of an image with a memorized map is illustrated. A map 205 is adapted to correlate specific reference pattern features with physical locations on the sphere 201. To determine the angular position of the sphere, the angular distance between the present location of the pattern features on the sphere and the location of the pattern features when the sphere was in a home (i.e. rest) position must be determined. When the sphere, and the reference pattern features are in the home position, the angular coordinates of yaw, pitch, and roll are defined as zero. As the sphere rotates from the home position, the angular distances between the current location of pattern features and the home location of those features increases. The angular coordinates of yaw, pitch and roll, of the sphere change as a function of the angular distances.

An image 203 captures surface pattern features 204 of an area observed 202 of a sphere 201. On a map of the sphere 205, the correlating pattern features are located 209 and the numerical coordinates of the image 207 and 208 are determined. The numerical coordinates on the map 205 are calibrated to indicate how far the sphere has moved from its home position. By comparing FIG. 2a and FIG. 2b, correlation of a third dimension is illustrated. Another image 212 captures surface pattern features 213 of an area observed 215 on the sphere 201; On the map of the sphere 205, the correlating pattern features are located 214. The coordinates of the image 207 and 208 correlate to the same coordinates as the FIG. 2a example, however an additional third coordinate is produced by the angle of image rotation 211 necessary to match the image features 212 with the map 205. This angle of image rotation 211 is a function of an angular rotation 210 of the sphere 201. The roll pitch and yaw of the sphere is a function of the coordinates 207, 208 and 211, which one skilled in the art will understand how to calculate.

In another embodiment, the home position can be defined by whatever arbitrary initial rotational position the sphere has and the map coordinates recalibrated accordingly. The initial rotational position is defined as the new home position where yaw, pitch and roll are zero. An initial image 217 of the sphere determines the observable area 218 of the sphere 201 when the sphere 201 is in the home position and the associated location 219 of the image 217 on the map 205 is used to recalibrate the map coordinates. If a captured image shows the area 218, then the yaw, pitch and roll are zero. However, if the captured image correlates to another area 220 on the map 205, then the sphere has rotated from its home position and the new angular position of the sphere can be calculated by first determining the coordinates of the image, and angular rotation of the image.

The advantages of using pattern recognition for position detection include: only a single image is required to precisely determine the exact position of the object, it is not necessary for the system to keep track of the object's relative movements over time in order to establish the object's current position, and no physical contact is required between the sensor and the object. In any embodiment of the present invention, the surface reference pattern may be a monochromatic or multicolored random, pseudo random, or predefined pattern, as long as the pattern allows the controller to uniquely correlate an image to an absolute position on the object.

In FIG. 3, a position detection system 300, in combination with the Gas Supported Inertial Sensor Assembly 301 of the '6540 Application, of one embodiment of the present invention is illustrated. The gas supported inertial navigation system (INS) 301 utilizes a freely rotating spherically shaped inertial sensor assembly (ISA) 302. The ISA 302 is supported, or floats, within a spherically shaped gas bearing 303 generated by a plurality of gas pads 304-1 and 304-2. (Although only two gas pads are shown in FIG. 2, it will be understood in the art that more than two gas pads can be used to achieve the desired result.) Pressurized gas is applied to the gas pads 304-1 and 304-2 and the supported ISA 302 rides on a cushion of gas with little or no contact between the ISA and the gas pads 304-1 and 304-2. In one embodiment, the gas is air. The frictionless gas bearing 303 (i.e. flow of gas 203) allows the ISA 302 to rotate on all axes. In this embodiment, the optical sensor 305 is secured by a mounting bracket 306 to the outer shell assembly 307 of the INS 301. The ISA 302 is free to rotate within the outer shell assembly 307. Reference number 310 generally illustrates an example of a rotational motion of the ISA 302. Additional details regarding the gas bearing 303, gas pads 304, the INS 301, and the ISA 300 are found in the '6540 Application herein incorporated by reference. The optical sensor 305 is coupled 308 to a controller 309. In this embodiment, the surface of the ISA 302 is covered with a reference pattern, and a map of the reference pattern is programmed into the memory of the controller 309 such that reference pattern's characteristics are correlated with specific coordinates on the ISA's 302 spherical surface. When the position detection system is activated to determine angular position, the optical sensor 305 captures an image of the surface of the ISA 302 and communicates the image to the controller 309. The controller 309 correlates the features of the image to the memorized map thus identifying the specific area of the sphere currently in front of the sensor. Further resolving the rotational angle of the image with the memorized map image, the controller 309 determines the absolute angular position and attitude of the ISA 302.

Figure 4:
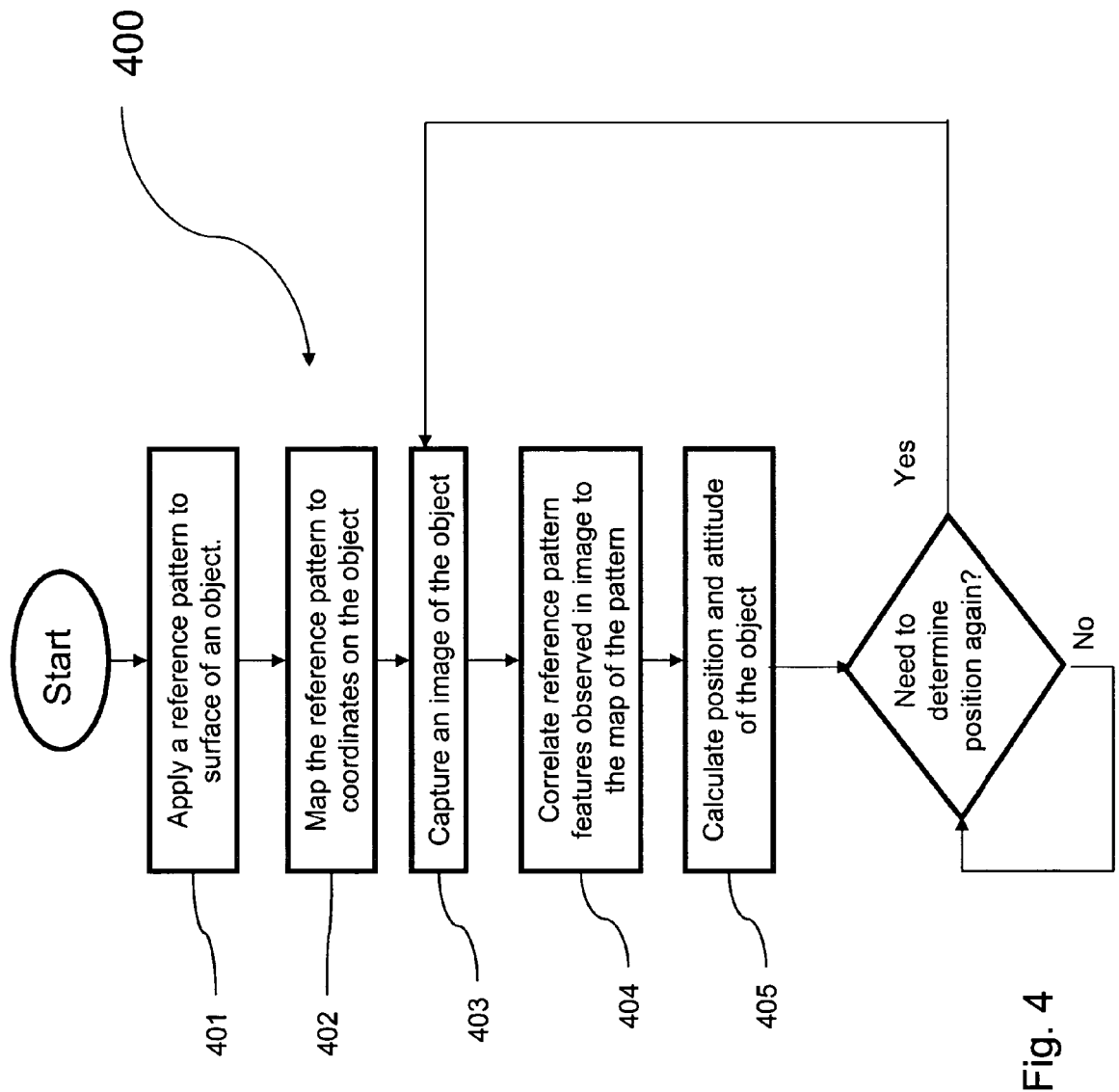
FIG. 4 is a flow chart of a method embodiment of the present invention.

In FIG. 4, a method for precisely determining the angular position of a rotatably movable object 400 of an embodiment of the present invention is illustrated. The method first comprising applying a reference pattern to the surface of the object (401) and mapping the reference pattern to specific coordinates on the object (402). To determine the subsequent angular-position of the object at any time, the method further comprising capturing an image of the object which captures the currently observable reference pattern features (403), correlating the reference pattern features and angle of rotation observed in the image to the map of the pattern (404), and calculating the current position and attitude of the movable object (405). To determine the current position of the object at any subsequent time, repeat the method beginning with capturing an image of the object (403).

In other embodiments, the present invention can further determine the angular velocity of a rotating object having a surface reference pattern by calculating the change in angular position over time from a sequence of two or more captured images. The angular position of the object for each image in the sequence is determined by correlating the observable reference pattern features and angle of rotation to a map of the pattern. The resulting sequence of angular positions defines the angular path of rotation. The angular velocity is calculated as a function of the length of the angular path of rotation and the time elapsed between images in the sequence. The time elapsed between capturing each image in the sequence must be sufficiently short in relation to the inertial rotational momentum of the object so the path of rotation between any two sequential images is the shortest possible path.

In another embodiment, the present invention can be combined with the motion detection system of the commonly assigned '7057 Application, herein incorporated by reference. In this embodiment, a sequence of one or more images of a surface reference pattern is processed through a delta detection algorithm to determine the delta-x and delta-y displacement of the images. The angular velocity is calculated as a function of the total displacement indicated by the sequence of images and the time elapsed between images in the sequence.

Several means are available to implement the controller element of the current invention. These means include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An angular position detection system for an object having a reference surface pattern comprising:
    an optical sensor adapted to generate image signals of a reference surface pattern on an object;
    a memory having a map of the reference surface pattern stored therein;
    a processor adapted to determine the surface location of the object by comparing an image signal from the optical sensor with the map of the surface pattern in the memory; and
    the processor further adapted to determine the angular position of the object;
    wherein the object is a spherical inertial sensor assembly for an inertial navigation system.

2. The angular position detection system of claim 1, wherein the map includes coordinates for reference surface pattern features.

3. The angular position detection system of claim 2, wherein the map coordinates for reference surface pattern features are initially calibrated to a sphere in a home position.

4. The angular position detection system of claim 1, wherein the reference surface pattern is a random pattern.

5. The angular position detection system of claim 1, wherein the reference surface pattern is a pseudo-random pattern.

6. The angular position detection system of claim 1, wherein the reference surface pattern is a pre-defined pattern.

7. The angular position detection system of claim 1, wherein the reference surface pattern is a multicolored pattern.

8. The angular position detection system of claim 1, wherein the reference surface pattern is a monochromatic pattern.

9. The angular position detection system of claim 1, further comprising: a housing, said optical sensor located in such housing.

10. The angular position detection system of claim 9, further comprising: a solid mounting surface, said housing attached to the solid mounting surface.

11. The angular position detection system of claim 9, wherein the processor is located in the housing.

12. The angular position detection system of claim 9, wherein the memory is located in the housing.

13. The angular position detection system of claim 9, wherein the processor and the memory are located in the housing.

14. The angular position detection system of claim 1, wherein the processor is further adapted to output the angular position of the inertial sensor assembly.

15. The angular position detection system of claim 1, wherein the processor is further adapted to determine the angular velocity of the object by calculating the change in angular position over time from a sequence of two or more of the image signals.

16. The angular position detection system of claim 1, wherein the processor is further adapted to apply a delta detection algorithm to a series of two or more of the image signals to determine the distance and direction the object has moved, the controller still further adapted to calculate the angular velocity of the object's movement based on a time sequence between the received series of image signals and the distance moved.

17. An angular position detection apparatus for an inertial navigation system comprising:
    an inertial navigation system including a gas bearing supported spherical inertial sensor assembly, said spherical inertial sensor having a reference surface pattern;
    an optical sensor adapted to generate image signals of the reference surface pattern on the inertial sensor assembly;
    a memory having a map of the reference surface pattern stored therein;
    a processor adapted to determine the surface location of the object by comparing an image signal from the optical sensor with the map of the surface pattern in the memory; the processor further adapted to determine the angular position of the inertial sensor assembly.

18. The angular position detection apparatus for an inertial navigation system of claim 17, wherein the processor is further adapted to output the angular position of the inertial sensor assembly.

19. The angular position detection apparatus for an inertial navigation system of claim 18 further comprising:
    an outer shell assembly enveloping the spherical inertial sensor assembly, said optical sensor attached to the outer shell assembly.

20. The angular position detection system of claim 17, wherein the map includes coordinates for reference surface pattern features.

21. The angular position detection system of claim 20, wherein the map coordinates for reference surface pattern features are initially calibrated to a sphere in a home position.

22. The angular position detection system of claim 17, wherein the reference surface pattern is a random pattern.

23. The angular position detection system of claim 17, wherein the reference surface pattern is a pseudo-random pattern.

24. The angular position detection system of claim 17, wherein the reference surface pattern is a pre-defined pattern.

25. The angular position detection system of claim 17, wherein the reference surface pattern is a multicolored pattern.

26. The angular position detection system of claim 17, wherein the reference surface pattern is a monochromatic pattern.

27. The angular position detection system of claim 17, wherein the processor is further adapted to determine the angular velocity of the spherical inertial sensor assembly by calculating the change in angular position over time from a sequence of two or more of the image signals.

28. The angular position detection system of claim 17, wherein the processor is further adapted to apply a delta detection algorithm to a series of two or more of the image signals to determine the distance and direction the spherical inertial sensor assembly has moved, the controller still further adapted to calculate the angular velocity of the spherical inertial sensor assembly's movement based on a time sequence between the received series of image signals and the distance moved.

29. A method for determining the angular position of an object, the method comprising:
   imaging an area of a pattern on the surface of an object;
   determining the location of the imaged area by comparing the imaged area with a map of the pattern on the surface of the object;
   determining the rotation of the imaged area by comparing the angle of the pattern of the imaged area with a map of the pattern on the surface of the object;
   calculating the angular position of the object;
   outputting the angular position of the object;
   wherein the object is a spherical inertial sensor assembly for an inertial navigation system.

30. The method of claim 29, further comprising:
   obtaining a sequence of images by imaging the area of the pattern on the surface of the object one or more additional times; and
   determining the angular velocity of the spherical inertial sensor assembly by calculating the rate of change in angular position over time from the sequence of images.

31. The method of claim 30, wherein the rate of taking images is related to the rotational velocity of the object.

32. The method of claim 29, further comprising:
   obtaining a sequence of images of areas of patterns on the surface of the object, wherein each image is taken in sufficiently proximate time to the prior image so that sequential images include overlapping areas of patterns;
   determining the distance moved by the object by applying a delta detection algorithm to the sequence of images; and
   determining the angular velocity of the object's movement based on a time sequence between the received sequence of images and the distance moved.

33. A method for determining the angular position of a rotating object, the method comprising:
   applying a reference pattern to the surface of the object;
   mapping the reference pattern to specific locations on the object;
   obtaining an image of the object which captures an area of the reference pattern on the surface of the object;
   correlating the features of the area of the reference pattern imaged and the angle of rotation of the area of the reference pattern imaged to the map of the reference pattern;
   determining the angular position of the object based on the correlation between the features of the area of the reference pattern imaged and the angle of rotation of the area of the reference pattern imaged and the map of the reference pattern; and
   outputting the angular position of the object;
   wherein the object is a spherical inertial sensor assembly for an inertial navigation system.

34. The method of claim 33, the step of mapping the reference pattern to specific locations on the object further comprising:
   applying a coordinate system to the features of the reference pattern.

35. The method of claim 34, the step of mapping the reference pattern to specific locations on the object further comprising:
   calibrating the coordinate system to the sphere in a home position.

36. The method of claim 33, further comprising:
   obtaining a sequence of images of the object which capture areas of the reference pattern on the surface of the object; and
   determining the angular velocity of the object by calculating the rate of change in angular position over time from the sequence of images.

37. The method of claim 33, further comprising:
   obtaining a sequence of images of the object which capture areas of the reference pattern on the surface of the object, wherein each image is taken in sufficiently proximate time to the prior image so that sequential images include overlapping areas of the reference pattern;
   determining the distance moved by the object by applying a delta detection algorithm to the sequence of images; and
   determining the angular velocity of the object's movement based on a time sequence between the received sequence of images and the distance moved.

38. A method for determining the angular position of an inertial sensor assembly, the method comprising:
   applying a reference pattern to the surface of the inertial sensor assembly;
   mapping the reference pattern to specific locations on the inertial sensor assembly;
   obtaining an image of the inertial sensor assembly which captures an area of the reference pattern on the surface of the inertial sensor assembly;
   correlating the features of the area of the reference pattern imaged and the angle of rotation of the area of the reference pattern imaged to the map of the reference pattern;
   determining the absolute position of the inertial sensor assembly based on the correlation between the features of the area of the reference pattern imaged and the angle of rotation of the area of the reference pattern imaged and the map of the reference pattern; and
   outputting the absolute position of the inertial sensor assembly.

39. The method of claim 38, wherein the inertial sensor assembly is spherical.

40. The method of claim 39, wherein the inertial sensor assembly is supported by a gas bearing.

41. The method of claim 40, the step of mapping the reference pattern to specific locations on the inertial sensor assembly further comprising:
   applying a coordinate system to the features of the reference pattern.

42. The method of claim 41, the step of mapping the reference pattern to specific locations on the inertial sensor assembly further comprising:
   calibrating the coordinate system to the inertial sensor assembly in a home position.

43. The method of claim 38, further comprising repeating the steps of:
   obtaining an image of the inertial sensor assembly which captures an area of the reference pattern on the surface of the inertial sensor assembly;

correlating the features of the area of the reference pattern imaged and the angle of rotation of the area of the reference pattern imaged to the map of the reference pattern; and determining the absolute position of the inertial sensor assembly based on the correlation between the features of the area of the reference pattern imaged and the angle of rotation of the area of the reference pattern imaged and the map of the reference pattern.

44. The method of claim 38, further comprising:

obtaining a sequence of images of the inertial sensor assembly which capture areas of the reference pattern on the surface of the inertial sensor assembly; and determining the angular velocity of the inertial sensor assembly by calculating the rate of change in angular position over time from the sequence of images.

45. The method of claim 38, further comprising:

obtaining a sequence of images which capture areas of the reference pattern on the inertial sensor assembly, wherein each image is taken in sufficiently proximate time to the prior image so that sequential images are overlapping areas of the reference pattern;

determining the distance moved by the inertial sensor assembly by applying a delta detection algorithm to the sequence of images; and determining the angular velocity of the inertial sensor assembly's movement based on a time sequence between the received sequence of images and the distance moved.

46. A computer-readable medium having computer-executable instructions for performing a method for precisely determining the absolute position of a rotating object having a reference pattern applied to the object surface, the method comprising:

capturing an image of reference pattern features on the surface of the object; correlating the captured reference pattern features and angle of rotation with a table that correlates the features of the pattern with coordinates on the object;

determining the angular position of the object based on the correlation between the captured reference pattern features and the coordinates determine from the table; and outputting the angular position of the object;

wherein the object is a spherical inertial sensor assembly for an inertial navigation system.

47. The method of claim 46, wherein the table is a map of the reference pattern which correlates a coordinate system to reference system pattern features of the object in a home position.

48. The method of claim 46, further comprising:

obtaining a sequence of images of reference pattern features on the surface of the object; and determining the angular velocity of the object by calculating the rate of change in angular position over time from the sequence of images.

49. The method of claim 46, further comprising:

obtaining a sequence of images of reference pattern features on the surface of the object, wherein each image is taken in sufficiently proximate time to the prior image so that sequential images include overlapping areas of the reference pattern;

determining the distance moved by the object by applying a delta detection algorithm to the sequence of images; and determining the angular velocity of the object's movement based on a time sequence between the received sequence of images and the distance moved.

* * * * *